United States Patent
Kuriu et al.

(10) Patent No.: US 8,187,683 B2
(45) Date of Patent: May 29, 2012

(54) MULTILAYERED POLYAMIDE TUBE FOR FOOD PACKAGING

(75) Inventors: Hiroki Kuriu, Moriyama (JP); Hiroyuki Yabuta, Hasselt (BE)

(73) Assignee: Gunze Limited, Ayabe-Shi, Kyoto (JP)

( * ) Notice: Subject to any disclaimer, the term of this patent is extended or adjusted under 35 U.S.C. 154(b) by 115 days.

(21) Appl. No.: 12/934,869

(22) PCT Filed: Mar. 26, 2009

(86) PCT No.: PCT/JP2009/056197
§ 371 (c)(1),
(2), (4) Date: Sep. 27, 2010

(87) PCT Pub. No.: WO2009/123027
PCT Pub. Date: Oct. 8, 2009

(65) Prior Publication Data
US 2011/0027511 A1 Feb. 3, 2011

(30) Foreign Application Priority Data

Mar. 31, 2008 (JP) .................................. 2008-090171

(51) Int. Cl.
*A22C 13/00* (2006.01)

(52) U.S. Cl. ..................... 428/34.8; 428/34.9; 428/35.7; 426/106; 426/127; 426/129; 264/235.8; 264/173.14; 264/173.15; 264/210.7

(58) Field of Classification Search .................. 428/34.8, 428/34.9, 35.1, 35.7, 474.4; 426/106, 127, 426/129; 264/469, 173.14, 173.15, 210.7, 264/235.8
See application file for complete search history.

(56) References Cited

U.S. PATENT DOCUMENTS

| | | |
|---|---|---|
| 4,888,223 A | 12/1989 | Sugimoto et al. |
| 5,296,170 A | 3/1994 | Sugimoto et al. |
| 5,562,996 A * | 10/1996 | Kuriu et al. ................ 428/474.4 |

(Continued)

FOREIGN PATENT DOCUMENTS

EP 0873759 A2 10/1998
(Continued)

OTHER PUBLICATIONS

International Search Report of PCT/JP2009/056197, mailing date Jun. 23, 2009.

(Continued)

*Primary Examiner* — N. Edwards
(74) *Attorney, Agent, or Firm* — Westerman, Hattori, Daniels & Adrian, LLP

(57) ABSTRACT

An object of the present invention is to provide a multilayered polyamide-based tube for food packaging that is free from blocking in a Layer (C), and that has an excellent adherence to processed meat or like packaged food. The present invention provides a multilayered polyamide-based tube for food packaging comprising a Layer (A), a Layer (B) and a Layer (C);

the multilayered polyamide-based tube having a low-temperature shrinkage ratio of 2 to 10%, and exhibiting heat shrinkage properties and gas barrier properties;

the Layer (A) containing a polyamide-based resin;

the Layer (B) containing a polyolefin-based resin; and the Layer (C) that comes in contact with the packaged food, the Layer (C) being a Layer (C-1) that contains a polypropylene-based resin having a heat distortion temperature (ISO 75B-1 or ISO 75B-2) of not less than 60° C. and a Vicat softening point of not less than 120° C., and that has a surface wetting tension of not less than 35 mN/m; or the Layer (C) being a Layer (C-2) that contains a linear low-density polyethylene having a density of not less than 0.92 g/cm³ but less than 0.95 g/cm³, and that has a surface wetting tension of not less than 35 mN/m.

11 Claims, 1 Drawing Sheet

U.S. PATENT DOCUMENTS

| | | | |
|---|---|---|---|
| 5,612,104 A | | 3/1997 | Grund |
| 5,843,502 A | * | 12/1998 | Ramesh .................. 426/127 |
| 6,194,040 B1 | * | 2/2001 | Delius et al. ............... 428/34.8 |
| 6,592,975 B1 | | 7/2003 | Ueyama et al. |
| 6,645,640 B1 | * | 11/2003 | Kuriu .................. 428/474.4 |
| 6,984,442 B2 | * | 1/2006 | Brebion et al. ............. 428/212 |
| 7,014,920 B2 | * | 3/2006 | Kuriu .................. 428/474.4 |
| 7,244,481 B2 | * | 7/2007 | Vicik et al. ................. 428/34.8 |
| 2002/0061412 A1 | | 5/2002 | Ueyama et al. |
| 2003/0049471 A1 | | 3/2003 | Kuriu |
| 2005/0287322 A1 | | 12/2005 | Grund et al. |
| 2011/0027511 A1 | * | 2/2011 | Kuriu et al. ................ 428/35.7 |

FOREIGN PATENT DOCUMENTS

| | | | |
|---|---|---|---|
| JP | 64-064845 A | | 3/1989 |
| JP | 2-135230 A | | 5/1990 |
| JP | 10-100346 A | | 4/1998 |
| JP | 11-155473 A | | 6/1999 |
| JP | 2002-172746 A | | 6/2002 |
| WO | 95/13707 A1 | | 5/1995 |
| WO | 99/33657 A1 | | 7/1999 |
| WO | 01/78980 A1 | | 10/2001 |
| WO | 2004-005025 A1 | | 1/2004 |

OTHER PUBLICATIONS

Supplementary European Search Report dated May 24, 2011, issued in corresponding European Patent Application No. 09729025.8.

* cited by examiner

MULTILAYERED POLYAMIDE TUBE FOR FOOD PACKAGING

TECHNICAL FIELD

The present invention relates to a multilayered polyamide-based tube for food packaging that has excellent adherence to the packaged food.

BACKGROUND ART

In multilayered polyamide-based tubes for food packaging, polyolefin-based resins are generally used as the layer that is in contact with the packaged food, such as processed meat. There is a method in which a corona treatment or the like is applied to the surface of the layer that is in contact with the packaged food to improve the adherence to the packaged food (for example, Patent Documents 1 to 3).

Such a technique makes it possible to obtain a multilayered polyamide-based tube for food packaging that is free from blocking between the inner surfaces thereof immediately after film production, and free from opening problems. However, depending on the conditions under which the multilayered polyamide-based tube for food packaging is stored before being used, blocking between the inner surfaces thereof may occur to remarkably decrease the opening properties. In particular, if a packaging material with a high low-temperature shrinkage ratio is wound around a paper tube immediately after being produced, the winding tightens as time passes. This causes blocking between the inner surfaces of the multilayered tube due to the stress that is generated.

Patent Document 1: Japanese Unexamined Patent Publication No. 1989-64845
Patent Document 2: Japanese Unexamined Patent Publication No. 1990-135230
Patent Document 3: Japanese Unexamined Patent Publication No. 1999-155473

DISCLOSURE OF THE INVENTION

Problem to Be Solved by the Invention

One of the main objects of the present invention is to provide a multilayered polyamide-based tube for food packaging in which the surface of the layer that is in contact with the processed meat or like food packaged in the multilayered tube is free from blocking and has an excellent adherence to the packaged food.

Means for Solving the Problem

The present inventors found that the above object can be achieved by adding a polypropylene-based resin having a predetermined heat distortion temperature and Vicat softening point, or a linear low-density polyethylene having a predetermined density to the layer that is in contact with the packaged food. The present invention has been accomplished due to further studies based on this finding.

The present invention provides the multilayered polyamide-based tubes for food packaging described below and a method for producing said multilayered tubes.

Item 1. A multilayered polyamide-based tube for food packaging comprising a Layer (A), a Layer (B) and a Layer (C);

the multilayered polyamide-based tube having a low-temperature shrinkage ratio of 2 to 10%, and exhibiting heat shrinkage properties and gas barrier properties;

the Layer (A) containing a polyamide-based resin;
the Layer (B) containing a polyolefin-based resin; and
the Layer (C) that comes in contact with the packaged food,
the Layer (C) being a Layer (C-1) that contains a polypropylene-based resin having a heat distortion temperature (ISO 75B-1 or ISO 75B-2) of not less than 60° C. and a Vicat softening point of not less than 120° C., and that has a surface wetting tension of not less than 35 mN/m; or
the Layer (C) being a Layer (C-2) that contains a linear low-density polyethylene having a density of not less than 0.92 g/cm$^3$ but less than 0.95 g/cm$^3$, and that has a surface wetting tension of not less than 35 mN/m.

Item 2. The multilayered polyamide-based tube for food packaging according to Item 1, wherein the polyamide-based resin contained in the Layer (A) is at least one member selected from the group consisting of 6-nylon, 66-nylon, 11-nylon, 12-nylon, 610-nylon, 6T-nylon, crystalline aromatic nylon, amorphous aromatic nylon, copolymers of 6-nylon and 66-nylon, copolymers of 6-nylon and 12-nylon, copolymers of 6-nylon and 11-nylon, and copolymers of 6-nylon and 6T-nylon.

Item 3. The multilayered polyamide-based tube for food packaging according to Item 1 or 2, wherein the polyolefin-based resin contained in the Layer (B) is at least one member selected from the group consisting of maleic anhydride modified polyolefins, ionomer resins, ethylene-vinylacetate copolymers, ethylene-ethyl acrylate copolymers, ethylene-acrylic acid copolymers, and ethylene-methacrylic acid copolymers.

Item 4. The multilayered polyamide-based tube for food packaging according to any one of Items 1 to 3, wherein the polypropylene-based resin of the Layer (C-1) has a heat distortion temperature (ISO 75B-1 or ISO 75B-2) of 60 to 120° C., and a Vicat softening point of 120 to 160° C.

Item 5. The multilayered polyamide-based tube for food packaging according to any one of Items 1 to 3, wherein the linear low-density polyethylene contained in the Layer (C-2) is a polymer obtained by polymerizing using a metallocene catalyst.

Item 6. The multilayered polyamide-based tube for food packaging according to any one of Items 1 to 5, which has a total film thickness of 30 to 80 μm.

Item 7. A method for producing the multilayered polyamide-based tube for food packaging of Item 1, comprising the steps of:
(i) cylindrically co-extruding material compositions (A), (B) and (C) to give a tube having Layers (A), (B) and (C) respectively;
(ii) bi-axially drawing the tube obtained in Step (i);
(iii) applying an annealing treatment to the tube drawn in Step (ii); and
(iv) applying a corona treatment to the tube after the annealing treatment.

The present invention is explained in detail below.

1. Multilayered Polyamide-Based Tube for Food Packaging

The multilayered polyamide-based tube for food packaging of the present invention comprises a Layer (A), a Layer (B) and a Layer (C) as described below. The multilayered polyamide-based tube for food packaging of the present invention has a low-temperature shrinkage ratio of 2 to 10%, and exhibits heat shrinkage properties and gas barrier properties. The structure of each layer is described in detail below.

1.1 Layer (A)

Layer (A) containing the components described below may be formed on the outer side (the side that is not in contact with the packaged food) of the multilayered tube of the present invention. By providing the Layer (A), excellent film strength, drawability during film production, heat shrinkage properties and gas barrier properties can be rendered to the multilayered tube of the present invention.

The Layer (A) of the multilayered tube of the present invention essentially comprise polyamide-based resin(s). Preferable examples thereof are polyamides obtained by polycondensation of ω-amino acids, co-condensation polymerization of diamine with dicarboxylic acid, or the like. More specifically, 6-nylon, 66-nylon, 11-nylon, 12-nylon, 610-nylon, 6T-nylon, crystalline aromatic polyamides (those obtained by a polycondensation reaction of aromatic diamine with dicarboxylic acid or its derivative, such as polymeta xylene adipamide (MXD-nylon) and like crystalline aromatic nylons), amorphous aromatic polyamides (those obtained by a polycondensation reaction of aliphatic diamine with dicarboxylic acid or its derivative, such as amorphous nylon), copolymers of 6-nylon and 66-nylon, copolymers of 6-nylon and 12-nylon, copolymers of 6-nylon and 11-nylon, copolymers of 6-nylon and 6T-nylon, etc. These polyamide-based resins may be used singly or in combination of two or more. Among these, 6-nylon, and copolymer of 6-nylon and 66-nylon, are preferable.

Such combinations of the polyamide-based resins can be obtained by adding a crystalline aromatic polyamide to 6-nylon, or to copolymers of 6-nylon and 66-nylon described above. In this case, MX nylon (for example, S-6007 (grade name), relative viscosity of 2.7, manufactured by Mitsubishi Gas Chemical Co., Inc.) is preferable for the crystalline aromatic polyamide. The content of the crystalline aromatic polyamide relative to the total weight of resins composing the Layer (A) is preferably about 5 to 50 weight %, and more preferably about 20 to 40 weight %.

In the multilayered tube of the present invention, the Layer (A) may comprise at least one of the polyamide-based resins mentioned above. However, if necessary, inorganic or organic additives may be added to such an extent that does not adversely influence the effect of the invention. Examples of such additives include anti-blocking agents, nucleating agents, repellents, antioxidants, thermal stabilizers and metallic soap. For example, when an anti-blocking agent is necessary, silica, talc, kaolin or the like may be added in a proportion of about 100 to 50,000 ppm.

1.2 Layer (B)

In the present invention, the Layer (B) is formed to adhere the Layer (A) to a Layer (C) described later. A polyolefin-based resin may be used to form the Layer (B) of the multilayered tube of the present invention. Examples thereof include low-density polyethylenes (LDPE), linear low-density polyethylenes (LLDPE), polypropylenes, and modifications thereof. Examples of usable modifications include acid modified polyolefins, and maleic anhydride modified polyolefins are preferable. Specific examples include maleic anhydride graft modified LLDPE and like maleic anhydride modified polyethylenes, and maleic anhydride graft modified polypropylenes and like maleic anhydride modified polypropylenes.

Furthermore, ionomer resins, ethylene-vinylacetate copolymers, ethylene-ethyl acrylate copolymers, ethylene-acrylic acid copolymers, ethylene-methacrylic acid copolymers or the like may be used as the polyolefin-based resin for composing the Layer (B).

Among these, maleic anhydride modified polyethylene, maleic anhydride modified polypropylene and like acid modified polyolefins are preferable as the resin used for forming the Layer (B). These polyolefin-based resins may be used singly or in a combination of two or more.

The Layer (B) in the multilayered tube of the present invention may comprise the aforementioned polyolefin-based resin; however, to the extent that does not adversely influence the effect of the invention, inorganic or organic additives such as a pigment, a dye, an antioxidant and a thermal stabilizer may be added if necessary.

1.3 Layer (C)

In the multilayered tube of the present invention, the Layer (C) is in contact with the packaged food, such as processed food.

An example of the Layer (C) is a Layer (C-1) that contains a polypropylene-based resin having a heat distortion temperature (ISO 75B-1 or ISO 75B-2) of not less than 60° C., a Vicat softening point of not less than 120° C., and a surface wetting tension of not less than 35 mN/m, or a Layer (C-2) that contains a linear low-density polyethylene having a density of not less than 0.92 g/cm$^3$ but less than 0.95 g/cm$^3$, and a surface wetting tension of not less than 35 mN/m.

Each layer is explained in detail below.

1.3.1 Layer (C-1)

Layer (C-1) is formed of a polypropylene-based resin having a heat distortion temperature defined by ISO 75B-1 or ISO 75B-2 of not less than 60° C., preferably 60 to 120° C., and more preferably 70 to 100° C., and having a Vicat softening point of not less than 120° C., preferably 120 to 160° C., and more preferably 125 to 155° C.

In the present invention, the Vicat softening point is a value measured according to the definition of ISO 306 (A50 (50° C./h, 10 N).

The melt viscosity (MFR) of polypropylene-based resin measured according to ISO 1133 is preferably about 0.5 to 20 g/10 min., more preferably about 2 to 10 g/10 min., and still more preferably about 4 to 8 g/10 min.

Use of such a polypropylene-based resin makes it possible to obtain a multilayered tube comprising a Layer (C-1) having excellent blocking resistance, transparency, stretchability and the like.

A polypropylene-based resin that fulfills the above-mentioned heat distortion temperature and Vicat softening point may be suitably selected from known resins, homopolypropylenes, random copolymerized polypropylenes, block copolymerized polypropylenes and the like. Among these, random copolymerized polypropylenes, and block copolymerized polypropylenes are preferable.

Examples of random copolymerized polypropylenes include random copolymers of polyethylene and polypropylene in which propylene moiety and ethylene moiety are randomly aligned to form a copolymer.

These polypropylene-based resins are commercially available under trade names such as RD735CF (manufactured by Borealis AG, Clyrell RC1601 (manufactured by Lyondell-Basell Industries), Moplen RP215M (manufactured by LyondellBasell Industries), and the like.

In the multilayered tube of the present invention, the Layer (C-1) may comprise a polypropylene-based resin. However, inorganic or organic additives may be added, if necessary, to the extent that they do not adversely influence the effect of the present invention. Examples of usable additives include anti-blocking agents (silica, talc, kaolin, etc.), slipping agents, polyethylene waxes, antioxidants, thermal stabilizers, and dyes and pigments for coloration. Appropriate additives may be added depending on the necessity. There is no limitation to the amount of the additives added as long as it does not adversely influence the effect of the present invention; however, for example, about 100 to 50,000 ppm is preferable.

1.3.2 Layer (C-2)

Layer (C-2) comprises a linear low-density polyethylene (LLDPE) having a density of not less than 0.92 g/cm$^3$ but less than 0.95 g/cm$^3$, preferably 0.92 to 0.93 g/cm$^3$, and more preferably 0.925 to 0.93 g/cm$^3$. A particularly preferable example of a linear low-density polyethylene is metallocene LLDPE having a density of preferably about 0.92 to 0.93 g/cm$^3$, and more preferably about 0.92 to 0.925 g/cm$^3$.

In the present invention, the density is measured according to ISO 1183-1 Method A.

By setting the density of LLDPE within the above-mentioned range, a multilayered tube having excellent blocking resistance, transparency, stretchability and the like can be obtained.

Here, the term metallocene LLDPE means an LLDPE obtained by polymerizing with a metallocene catalyst (single site catalyst). Specific examples of metallocene catalysts include bis(ferroceno[2,3]inden-1-yl)dimethylsilylene zirconium dichloride, rac-(ferroceno[2,3]inden-1-yl)dimethylsilylene(tetramethylcyclopentadienyl)zirconium dichloride, rac-(ferroceno[2,3]inden-1-yl)dimethylsilylene(cyclopentadienyl)zirconium dichloride, rac-(ferroceno[2,3]inden-1-yl)dimethylsilylene(2-methylinden-1-yl)hafnium dichloride, rac-(ferroceno[2,3]inden-1-yl)dimethylsilylene(fluoren-9-yl)zirconium dichloride, rac-(ferroceno[2,3]inden-1-yl)dimethylsilylene(t-butyl amide) zirconium dichloride, rac-(4-ferrocenylferroceno[2,3]cyclopentadienyl)dimethylsilylene (tetramethylcyclopentadienyl)zirconium dichloride, bis(4-ferrocenyferroceno[2,3]cyclopentadienyl)dimethylsilylene zirconium dichloride, bis(9-ferrocenyfluorenyl)titanium dichloride, and the like.

For convenience, LLDPEs polymerized with a metallocene catalyst are commercially available under trade names such as Exeed 1023CA (manufactured by Exxon Mobil Chemical Company), Evolue SP2510 (manufactured by Prime Polymer Co., Ltd.), and the like.

Layer (C-2) may be formed by adding inorganic or organic additives to the LLDPE. Examples of usable additives include anti-blocking agents (silica, talc, kaolin, etc.), slipping agents, polyethylene waxes, antioxidants, thermal stabilizers, and dyes and pigments for coloration. Appropriate additives may be added depending on the necessity. There is no limitation to the amount added as long as it does not adversely influence the effect of the present invention; however, the preferable amount is, for example, about 100 to 50,000 ppm.

When packaging processed meat and the like with the multilayered tube of the present invention, the multilayered tube of the present invention exhibits satisfactory blocking resistance on the surfaces of both Layer (C-1) and Layer (C-2) even without applying an anti-blocking agent. However, an anti-blocking agent, such as cornstarch or starch, may be applied to the surfaces of Layer (C) if necessary.

1.4 Other Layers

In addition to the three layers described above, the multilayered tube of the present invention may further comprise additional layers. Examples of layers other than the aforementioned three layers (hereunder such a layer may be referred to as Layer (X)) include layers formed of a polyethylene terephthalate resin, a saponification product of an ethylene vinyl acetate copolymer (EVOH resin), a polypropylene-based resin, a polybutyrene terephthalate resin, etc.

Alternatively, the multilayered tube may be structured so as to have four or more layers by combining the aforementioned three layers. Specific examples of such a structure are Layer (A)/Layer (B)/Layer (A)/Layer (B)/Layer (C); Layer (A)/Layer (B)/Layer (C)/Layer (C); Layer (A)/Layer (A)/Layer (B)/Layer (C); Layer (A)/Layer (B)/Layer (A)/Layer (B)/Layer (C)/Layer (C); etc. For example, when the multilayered tube has the structure of Layer (A)/Layer (B)/Layer (A)/Layer (B)/Layer (C), the two Layers (A) may have the same or different constituents. When employing a structure other than those described above, the constituents of each layer may be suitably selected as long as the effect of the invention is not adversely influenced.

An example of another preferable embodiment of the present invention has the structure of Layer (A)/Layer (B)/Layer (A)/Layer (B)/Layer (C), wherein, for example, Layer (A) is formed of a 6-nylon homopolymer (film thickness: 15 μm), Layer (B) is formed of a maleic anhydride graft modified LLDPE (film thickness: 5 μm), and layer (C-1) is formed of a polypropylene-based resin (film thickness: 15 μm); or Layer (A) is formed of a copolymer of 6-nylon and 66-nylon (film thickness: 15 μm), Layer (B) is formed of a maleic anhydride graft modified LLDPE (film thickness: 5 μm), and Layer (C-2) is formed of an LLDPE (film thickness: 15 μm); etc.

A layer other than Layers (A) to (C) (Layer (X)) may be additionally provided between Layer (B) and Layer (C). For example, Layer (X) may be formed of a random copolymerized polypropylene (film thickness: 5 to 15 μm). The thickness of Layer (X) may be suitably selected depending on the thicknesses of Layers (A) and (B) and the total film thickness of the multilayered tube.

The total film thickness of the multilayered polyamide-based tube for food packaging of the present invention having the aforementioned layer structure is not particularly limited and may be suitably selected in accordance to the application. The total film thickness thereof is generally about 30 to 80 μm.

Layer (A) has a film thickness of generally about 5 to 50 μm, preferably about 10 to 50 μm, and more preferably about 5 to 40 μm. Layer (B) has a film thickness of generally about 2 to 15 μm, and preferably about 3 to 10 μm. When Layer (C-1) is used for Layer (C), the thickness thereof is generally about 2 to 50 μm, and preferably about 3 to 40 μm, and when Layer (C-2) is used for Layer (C), the thickness thereof is generally about 10 to 50 μm, and preferably about 10 to 40 μm.

The ratio of the film thickness of each layer (Layer (A)/Layer (B)/Layer (C)) is generally about 40/20/40 to 50/5/45 (%), preferably about 40/20/40 to 49/6/45(%), and more preferably about 40/20/40 to 47/10/43(%).

2. Production Method

The present invention also provides a method for producing a multilayered polyamide-based tube for food packaging. The method for producing a multilayered tube of the present invention comprises the following steps:

(i) cylindrically co-extruding material compositions (A), (B) and (C) to give a tube having Layers (A), (B) and (C) respectively;

(ii) bi-axially drawing the tube obtained in Step (i);

(iii) applying an annealing treatment to the tube drawn in Step (ii); and (iv) applying a corona treatment to the tube after the annealing treatment.

Specific constituents of the material compositions (A), (B) and (C) that respectively form Layer (A), Layer (B) and Layer (C) are the same as those previously described.

The method for producing a multilayered tube of the present invention is explained below with reference to FIG. 1, which schematically illustrates the production method as an example.

In FIG. 1, 1 indicates a polyamide-based multilayered tube formed by a double bubble method. The double bubble method is a technique in which material compositions (A) to (C) are cylindrically co-extruded using a circular die. The co-extruded films are subjected to a bi-axial drawing step (first bubbling) by blowing air therein, and then folded using pinch rolls. Thereafter, the films are expanded by supplying air therein again (second bubbling), and then subjected to an annealing treatment in the expanded condition.

The annealing temperature is preferably such that the temperature of the tube surface in the vicinity of the outlet of the annealing (in the area about 5 to 25 cm away from the annealing outlet) is more than 50° C. but less than 180° C. For example, the annealing temperature is preferably about 55 to 160° C., more preferably about 55 to 140° C., and still more preferably about 55 to 130° C. By heating the tube with a heater or the like in such a manner that the temperature of the tube surface in the predetermined area away from the outlet of the annealing falls within the aforementioned range, the effect of the invention is further enhanced. An annealing temperature that is lower than 50° C. renders insufficient annealing, resulting in a tendency to lower the blocking resistance and low-temperature shrinkage properties. An annealing temperature exceeding 180° C. renders excessive annealing treatment, resulting in a tendency to lower the high-temperature shrinkage properties and prevent the resulting tube from satisfactorily fitting the content held therein. The polyamide-based multilayered tube thus obtained can be continuously wound while applying a corona treatment. Alternatively, the corona treatment may be applied after winding the resulting multilayered polyamide-based tube.

In FIG. 1, 3 indicates a guide roll for guiding a multilayered tube 1. Each of 4,4' and 5,5' is a pair of pinch rolls. Between the rolls 4,4' and 5,5', air or other gas that has been introduced in the multilayered tube 1 is held in an airtight manner so that the multilayered tube 1 is kept fully expanded.

A corona discharge is applied to the multilayered tube 1 under the aforementioned condition from the outside toward the inner side of the tube. An apparatus A for use in the corona discharge may be a known one.

The apparatus A shown in FIG. 1 is provided with two pairs of corona discharge members. The upper corona discharge member comprises a corona discharge electrode roller 6 and a counter electrode roller 6' corresponding to the corona discharge electrode roller 6. The lower corona discharge member comprises a corona discharge electrode roller 7 and a counter electrode roller 7' corresponding to the corona discharge electrode roller 7. The pinch roll 4, and rollers 6, 6', 7, 7' are driven by a motor (not shown) via a transmission (not shown), and the pinch roll 5 is driven by the aforementioned motor (not shown) via another transmission (not shown).

The corona discharge mechanism for the corona discharge electrode rollers 6 and 7 is not shown in the figure. The gap between the electrodes, i.e., the space between the corona discharge electrode roller 6 or 7 and the corresponding counter electrode roller 6' or 7', may be suitably adjusted by making one of the electrodes (discharge electrode or counter electrode) movable. Based on the predetermined gap between the electrodes, the inner surfaces of the multilayered tube 1 will not be in contact with each other due to the air inside the multilayered tube 1 at least at the time that the corona discharge is applied. If the corona treatment is applied with the inner surfaces of the multilayered tube in contact with each other, the effect of the corona discharge cannot reach the surface of the outermost Layer (C). Therefore, it is necessary to prevent the inner surfaces of the multilayered tube 1 from being in contact with each other during the corona discharge treatment. The corona treatment is applied in the direction from the corona discharge electrode rollers 6 and 7 toward the corresponding counter electrode rollers 6' and 7'. More specifically, the corona discharge is conducted from the outside of the multilayered tube 1 towards the inside thereof, so that the discharged current is led from the outside of the film multilayered tube to the opposite outside of the film multilayered tube through the inside thereof.

By applying a corona discharge, the wetting tension on the polypropylene-based resin surface of the multilayered tube Layer (C) is increased. When the corona treatment is applied using only one discharge electrode, the treatment is applied from only one surface, resulting in an uneven treatment. Therefore, it is preferable that the corona treatment be applied using two or more discharge electrodes, and disposing the discharge electrodes externally and symmetrically with the multilayered tube therebetween, so that the corona treatment can be applied from both sides. This structure represents one preferable embodiment of the present invention.

The intensity of the corona treatment may be suitably selected depending on the type of multilayered tube, the feeding speed, the thickness of the multilayered tube, the diameter of the multilayered tube, etc. The strength obtained by applying the corona treatment may fall within a wide range. The intensity of the corona treatment may be suitably selected so that the Layer (C) has a surface wetting tension of not less than 35 mN/m. The surface wetting tension of the surface of Layer (C) is more preferably not less than 37 mN/m, and still more preferably 40 to 50 mN/m.

The method for the corona treatment is not limited to that using the apparatus shown in FIG. 1, and various other methods are applicable. For example, FIG. 1 illustrates an apparatus comprising two pairs of corona discharge electrode rollers and counter electrode rollers, i.e., 6,6' and 7,7'; however, an apparatus comprising corona discharge electrode rollers 12,13 and corresponding counter electrode rollers 12', 13', which are disposed perpendicular to the corona discharge electrode rollers 6,7, as shown in FIG. 2 may also be used. This arrangement allows the corona treatment to be applied from four directions, i.e., from the corona discharge electrode rollers 6,7,12,13 towards the counter electrode rollers 6',7', 12',13'.

Furthermore, an anti-blocking agent may be applied if necessary. The methods disclosed in the aforementioned Patent Document 1 may be employed as the method for applying the anti-blocking agent in the present invention.

In the above example, air is used for expanding the tube body; however, the effect of the corona treatment may sometimes be increased by using nitrogen gas, carbon dioxide, an inert gas, or the like. Therefore, a gas other than air may be suitably used. In the example described above, the tube body travels from the upper portion to the lower portion in the figure. However, the process shown in FIG. 1 may be conducted in such a manner that the tube body travels from the lower portion toward the upper portion of the apparatus, or the tube body may travel in the transverse direction. The traveling direction of the tube body is not particularly limited and may be suitably designed so as to facilitate the application of the treatment.

The multilayered polyamide-based tube for food packaging of the present invention thus prepared has the following excellent physical properties.

(a) Blocking Resistance (Opening Properties)

The multilayered polyamide-based tube for food packaging of the present invention exhibits blocking resistance (opening properties), as measured by the method disclosed in the Examples of the present invention below, that is less than 50 (g/15 mm in the width), and preferably about 0 to 40 (g/15 mm in the width). The multilayered tube of the present invention is free from blocking between the inner surfaces thereof even when the multilayered tube is wound in a roll and stored immediately after the film is produced.

(b) Adherence to Meat:

The multilayered polyamide-based tube for food packaging of the present invention preferably has an adherence as measured based on the method disclosed in the Examples described below in such a degree that the processed meat or like content packaged therein will adhere to the multilayered tube when an attempt is made to peel off only the multilayered tube.

If the multilayered tube has a high adherence to the meat after a heat treatment is applied in the production of the processed meat or the like, the Layer (C) of the multilayered tube will closely adhere to the meat so that the dripping of meat juices can be suppressed. Meat juices between the Layer (C) and the processed meat cause the tube contents to easily spoil. Furthermore, meat juices drip out when the tube is opened, adversely affecting the appearance thereof. If a multilayered tube has a poor adherence to the meat, the multilayered tube tends to separate from the meat at the cut portion when cut. Consumers dislike such products; therefore, it is preferable that the multilayered tube have an excellent adherence to meat.

(c) Surface Wettability

The multilayered polyamide-based tube for food packaging of the present invention has a surface wettability, when measured based on the method disclosed in the Examples described below, such that the Layer (C) has a surface wetting tension of not less than 35 mN/m, preferably not less than 37 mN/m, and more preferably about 40 to 50 mN/m. When the surface wettability falls within the above ranges, the compatibility of the processed meat with the inner surface of the multilayered tube can be enhanced, rendering an improved adherence of the meat to the inner surface of the multilayered tube.

(d) High-Temperature Shrinkage Properties

The multilayered polyamide-based tube for food packaging of the present invention has high-temperature shrinkage properties, when measured based on the method disclosed in the Examples described below, such that the shrinkage ratio is not less than 3%, and preferably about 10 to 25%.

Here, the expression "the shrinkage ratio is not less than 3%" indicates that the shrinkage ratio is not less than 3% in both the machine direction and the transverse direction.

The high-temperature shrinkage properties indicate the so-called heat shrinkage properties of a film. When the high-temperature shrinkage properties fall within the above range, the following effects can be achieved. First, the multilayered tube will shrink to hold the contents tightly when heat treatment is applied so that a tight fit is achieved. Second, the contents closely adhere to the multilayered tube without any space therebetween.

(e) Low-Temperature Shrinkage Properties

The multilayered polyamide-based tube for food packaging of the present invention has low-temperature shrinkage properties, when measured based on the method disclosed in the Examples described below, such that the shrinkage ratio is 2 to 10%, and preferably about 2 to 5%.

Here, the expression "the shrinkage ratio is 2 to 10%" indicates that the shrinkage ratio measured based on the method disclosed in the Examples described below falls within the range of "2 to 10%" in both the machine direction and the transverse direction.

Heat shrinkable multilayered tubes sometimes shrink due to the temperature at which they are stored or distributed. The low-temperature shrinkage ratio aims to evaluate the characteristics of the multilayered tube of the present invention that relate to natural shrinking outside of the shrinking process. As such, the lower the value, the better, since the low-temperature shrinkage ratio indicates the amount of unintended shrinkage.

Examples of foods for which the multilayered polyamide-based tube for food packaging of the present invention can be used include ham, sausage, bacon and like processed meat products; processed fish meat products; kamaboko (boiled fish paste), chikuwa (a tubular roll of baked fish paste) and like processed fish paste products; etc. Examples of the forms of packaging materials include casings, bag-like materials, etc.

Effect of the Invention

The multilayered polyamide-based tube for food packaging of the present invention can prevent the phenomenon of the multilayered tube naturally shrinking (shrinking at ordinary temperatures) and causing the winding of the product (the multilayered tube) on a roll to become too tight over time, such that the resulting stress causes blocking between the inner surfaces of the multilayered tube.

The multilayered polyamide-based tube for food packaging of the present invention has excellent blocking resistance, surface wettability, and high-temperature shrinkage properties in the Layer (C) that is in contact with the packaged food. Because the multilayered polyamide-based tube of the present invention has excellent adherence to food products (e.g., processed meat), the dripping of meat juices from the packaged meat can be prevented, reducing the risk that the packaged meat will spoil. This also prevents the multilayered tube from separating from the processed meat when cut.

BEST MODE FOR CARRYING OUT THE INVENTION

The present invention is explained in detail below with reference to Comparative Examples and Examples. However, the scope of the present invention is not limited to these Examples.

In the Examples and Comparative Examples, the heat distortion temperature is measured based on ISO 75B-1 or ISO 75B-2, the Vicat softening point is measured based on ISO 306 (A50 (50° C./h, 10 N), the density is measured based on ISO 1183-1 Method A, and the MFR is measured based on ISO 1133.

Example 1-1

The following layers were used for Layers (A) to (C-1).

Layer (A): copolymer of 6-nylon and 66-nylon (UBENYLON 5033FDX57 (product name and grade name), manufactured by Ube Industries, Ltd.).

Layer (B) (adhesive layer): modified polyolefin-based resin comprising a modified copolymer obtained by graft copolymerizing polypropylene with maleic anhydride (Admer QF551E (product name and grade name), manufactured by Mitsui Chemicals Europe GmbH).

Layer (C-1): random copolymerized polypropylene (RD735CF (product name and grade name), heat distortion temperature: 76° C., Vicat softening point: 132° C., MFR: 6.0 g/10 min., manufactured by Borealis AG).

An anti-blocking agent (silica, 8,000 ppm) was added to Layer (C-1).

Figure 1:
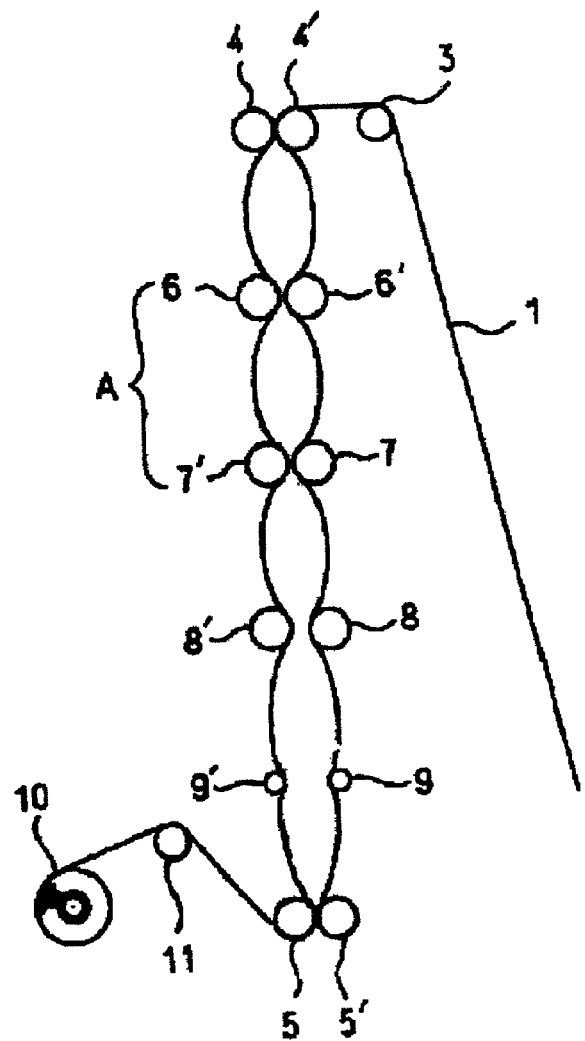
FIG. 1 schematically illustrates one embodiment of the corona treatment apparatus.
Figure 2:
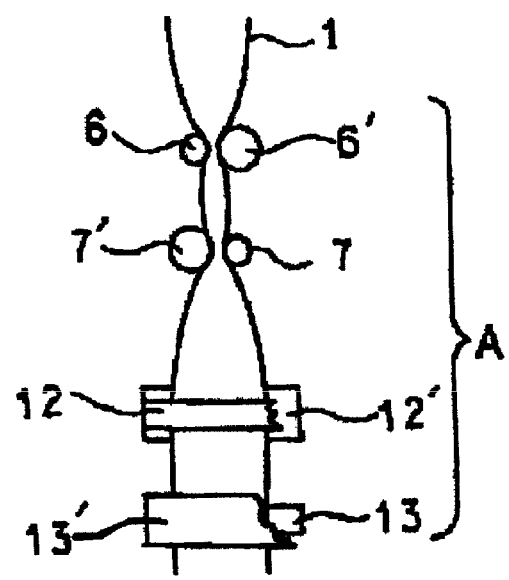
FIG. 2 schematically illustrates the discharge portion of the corona treatment apparatus.

The aforementioned materials were co-extruded using a circular die to obtain a three-layered tube, and the three-layered tube was subjected to biaxial drawing, followed by an annealing treatment so that the tube surface temperature became 100° C. (within the area about 10 cm away from the outlet of the annealing treatment). A three-layered biaxially oriented tube was thus obtained. Subsequently, a corona treatment was applied by discharging from the corona discharge electrode rollers 6 and 7 using a corona treatment apparatus as shown in FIG. 1. At this time, the corona discharge electrode roller (using a roll covered with rubber, length: 420 mm) and the counter electrode roller (using a metal roll, length: 420 mm) had a gap of 1.3 mm. The corona treatment was applied with the tube body being expanded with air. During the treatment, the gap between the inner surfaces of the tube had a width of about 1.3 mm, wherein the inner surfaces thereof were not in contact with each other but substantially flat.

The three-layered biaxially oriented tube that was subjected to a corona treatment was continuously wound to a length of 1,000 m on a paper tube, obtaining a seamless heat shrinkage multilayered tube having a gas barrier property.

Each layer of the multilayered tube of Example 1 thus obtained had a thickness of 20 μm, 5 μm, and 20 μm in order for Layer (A), Layer (B), and Layer (C-1), and the multilayered tube had a flattened tube width (the width when the tube was made flat) of 90 mm. The low-temperature shrinkage ratio of the multilayered tube of Example 1 was 4.5% in the machine direction and 4.0% in the transverse direction.

Example 1-2

A multilayered tube was produced in the same manner as in Example 1-1 except that the following layers were used for Layer (A) and Layer (C-1).

Layer (A): homopolymer of 6-nylon (Durethan B40FAM (product name and grade name), manufactured by LANXESS.

Layer (C-1): random copolymerized polypropylene (Clyrell RC1601 (product name and grade name), heat distortion temperature: 75° C., Vicat softening point: 140° C., MFR: 5.0 g/10 min., manufactured by LyondellBasell Industries).

Each layer of the multilayered tube of Example 1-2 had a thickness of 18 μm, 5 μm, and 17 μm in order for Layer (A), Layer (B), and Layer (C-1), and the multilayered tube had a flattened tube width of 90 mm. The multilayered tube of Example 1-2 had a low-temperature shrinkage ratio of 3.5% in the machine direction and 2.5% in the transverse direction.

Example 1-3

A multilayered tube was produced in the same manner as in Example 1-1 using the following materials.

First layer (Layer (A)): homopolymer of 6-nylon (Durethan B40FAM (product name and grade name), manufactured by LANXESS AG).

Second layer (Layer (B)): modified polyolefin-based resin comprising a modified copolymer obtained by graft copolymerizing linear low-density polyethylene with maleic anhydride (Modic M603 (product name and grade name), manufactured by Mitsubishi Chemical Europe GmbH).

Third layer (Layer (A)): the same 6-nylon as in the first layer.

Fourth layer (Layer (B)): the same modified polyolefin-based resin as in the second layer.

Fifth layer (Layer (x)): random copolymerized polypropylene (polypropylene terpolymer, Adsyl 5C39F (product name and grade name), heat distortion temperature: 62° C., Vicat softening point: 107° C., MFR: 5.5 g/10 min., manufactured by LyondellBasell Industries).

Sixth layer (Layer (C-1)): random copolymerized polypropylene (Moplen RP215M (product name and grade name), heat distortion temperature: 70° C., Vicat softening point: 134° C., MFR: 6.0 g/10 min., manufactured by LyondellBasell Industries).

The thickness of each layer of the multilayered tube of Example 1-3 was 7 μm, 2 μm, 10 μm, 3 μm, 13 μm and 3 μm in order for the first layer, second layer, third layer, fourth layer, fifth layer, and sixth layer, and the multilayered tube had a flattened tube width of 90 mm. The multilayered tube of Example 1-3 had a low-temperature shrinkage ratio of 4.0% in the machine direction and 2.5% in the transverse direction.

Example 1-4

A multilayered tube was produced in the same manner as in Example 1-1 except that the following layers were used for Layer (A) and Layer (C-1).

Layer (A): mixture of 70 weight % of a copolymer of 6-nylon and 66-nylon (UBENYLON 5033FDX57 (product name and grade name), manufactured by Ube Industries, Ltd.) and 30 weight % of MX nylon (aromatic nylon, MX-NYLON S-6007 (product name and grade name), manufactured by Mitsubishi Gas Chemical Company, Inc.).

Layer (C-1): homopolypropylene (Moplen HF500N (product name and grade name), heat distortion temperature: 95° C., Vicat softening point: 155° C., MFR: 12.0 g/10 min., manufactured by LyondellBasell Industries).

The thickness of each layer of the multilayered tube of Example 1-4 was 18 μm, 5 μm and 17 μm in order for Layer (A), Layer (B), and Layer (C-1), and the multilayered tube had a flattened tube width of 90 mm. The multilayered tube of Example 1-4 had a low-temperature shrinkage ratio of 3.0% in the machine direction and 2.5% in the transverse direction.

Example 1-5

A multilayered tube was produced in the same manner as in Example 1-1 except that the following layer was used for Layer (C-1).

Layer (C-1): random copolymerized polypropylene (Moplen EP1006 (product name and grade name), heat distortion temperature: 88° C., Vicat softening point: 149° C., MFR: 2.0 g/10 min., manufactured by LyondellBasell Industries).

The thickness of each layer of the multilayered tube of Example 1-5 was 18 μm, 5 μm and 17 μm in order for Layer (A), Layer (B), and Layer (C-1), and the multilayered tube had a flattened tube width of 90 mm. The multilayered tube of Example 1-5 had a low-temperature shrinkage ratio of 4.0% in the machine direction and 3.0% in the transverse direction.

Example 1-6

A multilayered tube was produced in the same manner as in Example 1-1 except that the following material was used for Layer (B) (adhesive layer).

Layer (B): ionomer (HIMILAN 1557, manufactured by Du Pont-Mitsui Polychemicals Co., Ltd.)

Example 1-7

A multilayered tube was produced in the same manner as in Example 1-1 except that the following layer was used for Layer (B) (adhesive layer).

Layer (B): ethylene methacrylic acid copolymer (NUCREL N410, manufactured by Du Pont-Mitsui Polychemicals Co., Ltd.).

Comparative Example 1-1

A multilayered tube was produced in the same manner as in Example 1-1 except that random copolymerized polypropylene (polypropylene terpolymer, Borseal TD220BF (product name and grade name), heat distortion temperature: 63° C., Vicat softening point: 117° C., MFR: 6.5 g/10 min., manufactured by Borealis AG) was used for Layer (C).

The thickness of Layer (A), Layer (B), and Layer (C) in the multilayered tube of Comparative Example 1-1 was 20 μm, 5 μm and 20 μm respectively, and the multilayered tube had a flattened tube width of 90 mm. The multilayered tube of Comparative Example 1-1 had a low-temperature shrinkage ratio of 5.0% in both the machine and transverse directions.

Comparative Example 1-2

A multilayered tube was prepared in the same manner as in Example 1-3 except that the random copolymerized polypropylene (Adsyl 5C39F (product name and grade name), heat distortion temperature: 62° C., Vicat softening point: 107° C., MFR: 5.5 g/10 min., manufactured by LyondellBasell Industries) that was used for the fifth layer Example 1-3 was used for the sixth layer.

The thickness of each layer of the multilayered tube of Comparative Example 1-2 was 7 μm, 2 μm, 10 μm, 3 μm, 13 μm and 3 μm in order for the first layer, second layer, third layer, fourth layer, fifth layer, and sixth layer, and the multilayered tube had a flattened tube width of 90 mm. The multilayered tube of Comparative Example 1-2 had a low-temperature shrinkage ratio of 3.5% in the machine direction and 2.5% in the transverse direction.

Comparative Example 1-3

A multilayered tube was prepared in the same manner as in Example 1-1 except that a random copolymerized polypropylene (Clyrell RC1601 (product name and grade name), heat distortion temperature: 75° C., Vicat softening point: 140° C., MFR: 5.0 g/10 min., manufactured by LyondellBasell Industries) was used for Layer (C) and an annealing treatment was applied so that the temperature on the tube surface became 40° C. (within the area about 10 cm away from the outlet of the annealing treatment).

The thickness of each layer of the multilayered tube of Comparative Example 1-3 was 20 μm, 5 μm, and 20 μm in order for Layer (A), Layer (B), and Layer (C), and the multilayered tube had a flattened tube width of 90 mm. The multilayered tube of Comparative Example 1-3 had a low-temperature shrinkage ratio of 11.0% in both the machine and transverse directions.

Comparative Example 1-4

A multilayered tube was prepared in the same manner as in Example 1 except that a random copolymerized polypropylene (Adsyl 3C39F (product name and grade name), heat distortion temperature: 71° C., Vicat softening point: 122° C., MFR: 5.5 g/10 min., manufactured by LyondellBasell Industries) was used for Layer (C), and an annealing treatment was applied so that the temperature on the tube surface became 200° C. (within the area about 10 cm away from the outlet of the annealing treatment).

The thickness of each layer of the multilayered tube of Comparative Example 1-4 was 20 μm, 5 μm and 20 μm in order for Layer (A), Layer (B) and Layer (C), and the multilayered tube had a flattened tube width of 90 mm. The multilayered tube of Comparative Example 4 had a low-temperature shrinkage ratio of 1.5% in the machine direction and 1.0% in the transverse direction.

Tables 1 and 2 show the components of the multilayered tubes of the Examples and Comparative Examples.

TABLE 1

| | Layer (A) Components | Layer (B) Components | Layer (C) Components | Layer (C) Heat distortion temperature | Layer (C) Vicat softening point |
|---|---|---|---|---|---|
| Example 1-1 | 6Ny-66Ny copolymer | Maleic anhydride graft modified PP | Random copolymerized PP Anti-blocking agent (Silica) | 76° C. | 132° C. |
| Example 1-2 | 6Ny | Maleic anhydride graft modified PP | Random copolymerized PP Anti-blocking agent (Silica) | 75° C. | 140° C. |
| Example 1-4 | 70 wt % 6Ny-66Ny copolymer 30 wt % MX nylon | Maleic anhydride graft modified PP | Homo PP Anti-blocking agent (Silica) | 95° C. | 155° C. |
| Example 1-5 | 6Ny-66Ny copolymer | Maleic anhydride graft modified PP | Random copolymerized PP Anti-blocking agent (Silica) | 88° C. | 149° C. |
| Example 1-6 | 6Ny-66Ny copolymer | Ionomer | Random copolymerized PP Anti-blocking agent (Silica) | 76° C. | 132° C. |

TABLE 1-continued

|  | Layer (A) Components | Layer (B) Components | Layer (C) Components | Heat distortion temperature | Vicat softening point |
|---|---|---|---|---|---|
| Example 1-7 | 6Ny-66Ny copolymer | Ethylene-methacrylic acid copolymer | Random copolymerized PP Anti-blocking agent (Silica) | 76° C. | 132° C. |
| Comp. Ex. 1-1 | 6Ny-66Ny copolymer | Maleic anhydride graft modified PP | Terpolymer PP Anti-blocking agent (Silica) | 63° C. | 117° C. |
| Comp. Ex. 1-3 | 6Ny-66Ny copolymer | Maleic anhydride graft modified PP | Random copolymerized PP Anti-blocking agent (Silica) | 75° C. | 140° C. |
| Comp. Ex. 1-4 | 6Ny-66Ny copolymer | Maleic anhydride graft modified PP | Terpolymer PP Anti-blocking agent (Silica) | 71° C. | 122° C. |

TABLE 2

|  | First Layer (Layer A) | Second Layer (Layer B) | Third Layer (Layer A) | Fourth Layer (Layer B) | Fifth Layer (Layer X) | Sixth Layer (Layer C) |
|---|---|---|---|---|---|---|
| Example 1-3 | 6Ny | Maleic anhydride graft modified LLDPE | 6Ny | Maleic anhydride graft modified LLDPE | Terpolymer PP | Random copolymerized PP (Heat distortion temperature of 70° C.) (Vicat softening point of 134° C.) Anti-blocking agent (Silica) |
| Comp. Ex. 1-2 | 6Ny | Maleic anhydride graft modified LLDPE | 6Ny | Maleic anhydride graft modified LLDPE | Terpolymer PP | Terpolymer PP (Heat distortion temperature of 62° C.) (Vicat softening point of 107° C.) Anti-blocking agent (Silica) |

The abbreviations in the tables are as defined below.
6Ny: 6-nylon
6Ny-66Ny copolymer: a copolymer of 6-nylon and 66-nylon
PP: polypropylene
LLDPE: linear low-density polyethylene
Evaluation The blocking resistance, adherence to meat, high-temperature shrinkage properties and low-temperature shrinkage properties of the multilayered tubes prepared above were evaluated. The evaluation methods are as described below.

Evaluation of Blocking Resistance (Evaluation of Opening Properties)

A tube-like film was wound in a length of 1,000 m on a paper tube, and left to stand at 40° C., 90% RH for three days to obtain a sample. Samples having a width of 15 mm were cut randomly from near the core, and the peel strength between inner surfaces of the samples was measured. The evaluation was conducted using the maximum values of the measurement results, based on the following index.

1: Less than 50 (g/15 mm width): Blocking was not observed.

2: Not less than 50 (g/15 mm width): Blocking was observed.

Adherence to Meat

The multilayered tube was wound on a paper tube and the resulting multilayered tube roll was left to stand at 40° C., 90% RH for three days. The multilayered tube was cut to a length of 40 cm to form a casing for processed meat. The resulting casing for processed meat was filled with processed meat. Each side of the casing was sealed with a gold ring-like clip, heated at 85° C. for 1.5 hours, and then cooled. The packaging material was peeled off from the processed meat. Evaluation was conducted based on the criteria described below.

A: (Excellent adherence to meat): When attempting to peel off only the casing, the processed meat packaged therein adhered to the casing, or some portions of the processed meat adhered to the casing.

B: (Good adherence to meat): Only the casing was peeled off with resistance.

C: (Poor adherence to meat): Only the casing was peeled off without resistance.

Surface Wetting Tension

The surface wetting tension was evaluated based on JIS K 6768. The larger the surface wetting tension value, the greater the affinity with the meat, thus indicating excellent adherence to the meat.

High-Temperature Shrinkage Properties

Reference lines of 10 cm were drawn on each film in the machine direction and transverse direction, and each film was immersed in 95° C. boiling water for 30 seconds. Thereafter, the shrunken length ratio was calculated based on the following formula.

(10 cm−the length of the reference line after shrinkage)÷10 cm×100(%)

2: Less than 3%: poor external appearance due to wrinkles caused by insufficient shrinkage.

1: Not less than 3%: No problem in shrinking properties. Excellent external appearance of the package was obtained.

Having a high shrinkage ratio achieves a tight fit between the multilayered tube and its content.

Low-Temperature Shrinkage Properties

Five sample pieces were cut off, and left to stand at 40° C., 90% RH for three days. The shrinkage ratios of each film in the machine direction and the transverse direction were measured. Reference lines of 10 cm were drawn on each film in the machine direction and transverse direction, and the shrunken length ratio was calculated based on the following formula.

(10 cm−the length of the reference line after shrinkage)÷10 cm×100(%)

1: Less than 10%: No excessively tight winding problem was observed due to natural shrinking.

2: Not less than 10%: Excessively tight winding occurred due to natural shrinking.

Table 3 shows the results of the evaluations described above.

The multilayered tubes of Examples 1-1 to 1-7 exhibited excellent heat shrinkage properties, and therefore excellent packaging conditions were maintained. Furthermore, these tubes had satisfactory opening properties when processed meat was packaged therein. No blocking was observed in these multilayered tubes.

In contrast, the multilayered tubes of Comparative Examples 1-1 and 1-2, wherein the polypropylene-based resin contained in the Layer (C) had a Vicat softening point of less than 120° C., exhibited blocking and insufficient opening properties.

Furthermore, the multilayered tube of Comparative Example 1-3, which had been subjected to an annealing treatment at 40° C., exhibited inferior blocking resistance and low-temperature shrinkage properties. This multilayered tube had inferior opening properties and a problem of excessively tight winding. The multilayered tube of Comparative Example 1-4, which had been subjected to an annealing treatment at 200° C., exhibited inferior high-temperature shrinkage properties and did not satisfactorily fit the content.

The adherence to meat was evaluated for the multilayered tubes to which a corona treatment was not applied, i.e., the tubes of Examples 1-1 to 1-7 and Comparative Examples 1-1 to 1-4. None of these multilayered tubes had satisfactory adherence to meat.

Example 2-1

The following materials were used for Layers (A) to (C-2).

Layer (A): copolymer of nylon 6 and nylon 66 (UBE NYLON 5033FDX57 (product name and grade name), manufactured by Ube Industries, LTD.).

Layer (B) (adhesive layer): modified polyolefin-based resin comprising a modified copolymer obtained by graft copolymerizing linear low density polyethylene with maleic anhydride (Admer NF468 E (product name and grade name), manufactured by Mitsui Chemicals Europe GmbH).

Layer (C-2): linear low-density polyethylene (Exeed 1023CA (product name and grade name), density: 0.923 g/cm$^3$, MFR: 1.0 g/10 min.), manufactured by Exxon Mobil Chemical Company) obtained by polymerization using a metallocene catalyst.

An anti-blocking agent (silica, 8,000 ppm) was added to Layer (C-2).

The aforementioned materials were co-extruded from a circular die to obtain a three-layered tube. The resulting three-layered tube was subjected to biaxial drawing, followed by an annealing treatment so that the tube surface temperature

TABLE 3

| | Blocking resistance (g/15 mm in width) | Adherence to meat | Surface wetting tension of Layer (C) (mN/m) | High-temperature shrinkage properties (%) MD/TD | | Low-temperature shrinkage properties (%) MD/TD | |
|---|---|---|---|---|---|---|---|
| Example 1-1 | 9 | 1 | A | 38 | 15/15 | 1 | 4.5/4.0 | 1 |
| Example 1-2 | 13 | 1 | A | 38 | 12/13 | 1 | 3.5/2.5 | 1 |
| Example 1-3 | 10 | 1 | A | 38 | 16/15 | 1 | 4.0/2.5 | 1 |
| Example 1-4 | 4 | 1 | A | 38 | 11/11 | 1 | 3.0/2.5 | 1 |
| Example 1-5 | 6 | 1 | A | 38 | 12/12 | 1 | 4.0/3.0 | 1 |
| Example 1-6 | 10 | 1 | A | 38 | 15/15 | 1 | 4.0/4.0 | 1 |
| Example 1-7 | 9 | 1 | A | 38 | 15/16 | 1 | 4.0/4.0 | 1 |
| Comp. Ex. 1-1 | 75 | 2 | A | 38 | 15/15 | 1 | 5.0/5.0 | 1 |
| Comp. Ex. 1-2 | 95 | 2 | A | 38 | 15/16 | 1 | 3.5/2.5 | 1 |
| Comp. Ex. 1-3 | 100 | 2 | A | 38 | 25/26 | 1 | 11.0/11.0 | 2 |
| Comp. Ex. 1-4 | 3 | 1 | A | 38 | 2/2 | 2 | 1.5/1.0 | 1 | reached 100° C. (within the area about 10 cm away from the outlet of the annealing treatment). A three-layered biaxially oriented tube was thus obtained. Subsequently, a corona treatment was applied by discharging from the corona discharge electrode rollers 6 and 7 using a corona treatment apparatus as shown in FIG. 1. At this time, the corona discharge electrode roller (using a roller covered with rubber, length of 420 mm) and the counter electrode roller (using a metal roll, length of 420 mm) had a gap of 1.3 mm. The corona treatment was applied with the tube body being expanded with air. During the treatment, the gap between the inner surfaces of the tube had a width of about 1.3 mm, wherein the inner surfaces thereof were not in contact with each other but substantially flat.

The three-layered biaxially oriented tube that had been subjected to a corona treatment was continuously wound to a length of 1,000 m on a paper tube, obtaining a seamless heat shrinkage multilayered tube having a gas barrier property.

Each layer of the tube of Example 2-1 thus obtained had a thickness of 15 µm, 5 µm, and 15 µm in order for Layer (A), Layer (B), and Layer (C-2), and the tube had a flattened tube width (the width when the tube was made flat) of 160 mm. The low-temperature shrinkage ratio of the multilayered tube of Example 2-1 was 5.0% in both the machine and transverse directions.

The multilayered tube of Example 2-1 exhibited excellent heat shrinkage properties, and therefore excellent packaging conditions were maintained. Furthermore, this multilayered tube had satisfactory opening properties when processed meat was packaged therein, and no blocking was observed.

Example 2-2

A multilayered tube was produced in the same manner as in Example 2-1 except that the following layer was used for Layer (C-2).

Layer (C-2): linear low-density polyethylene (Ultzex 4570 (product name and grade name), density: 0.945 g/cm$^3$, MFR: 7.0 g/10 min., manufactured by Prime Polymer Co., Ltd.)

Each layer of the multilayered tube of Example 2-2 had a thickness of 15 µm, 5 µm, and 15 µm in order for Layer (A), Layer (B), and Layer (C-2), and the multilayered tube had a flattened tube width of 160 mm. The multilayered tube of Example 2-2 had a low-temperature shrinkage ratio of 4.0% in the machine direction and 3.0% in the transverse direction.

Example 2-3

A multilayered tube was produced in the same manner as in Example 2-1 except that the following layer was used for Layer (A).

Layer (A): homopolymer of nylon 6 (Durethan B40FAM (product name and grade name), manufactured by LANXESS AG).

Each layer of the multilayered tube of Example 2-3 had a thickness of 15 µm, 5 µm, and 15 µm in order for Layer (A), Layer (B), and Layer (C-2), and the multilayered tube had a flattened tube width of 160 mm. The multilayered tube of Example 2-3 had a low-temperature shrinkage ratio of 4.0% in the machine direction and 2.5% in the transverse direction.

Example 2-4

A multilayered tube was produced in the same manner as in Example 2-1 except that the following layers were used for Layers (A) and (C-2).

Layer (A): homopolymer of nylon 6 (Durethan B40FAM (product name and grade name), manufactured by LANXESS AG); and Layer (C-2): linear low-density polyethylene (Dowlex 50560G (product name and grade name), density: 0.921 g/cm$^3$, MFR: 1.1 g/10 min., manufactured by Dow Europe GmbH).

Each layer of the multilayered tube of Example 2-4 had a thickness of 15 µm, 5 µm, and 15 µm in order for Layer (A), Layer (B), and Layer (C-2), and the multilayered tube had a flattened tube width of 160 mm. The multilayered tube of Example 2-4 had a low-temperature shrinkage ratio of 3.0% in the machine direction and 2.0% in the transverse direction.

Example 2-5

A multilayered tube was produced in the same manner as in Example 2-1 except that the following layers were used for Layers (A) and (C-2).

Layer (A): a mixture of 70 weight % copolymer of nylon 6 and nylon 66 (UBE NYLON 5033FDX57 (product name and grade name), manufactured by Ube Industries, Ltd.) with 30 weight % MX nylon (aromatic-based nylon) (MX-NYLON S6007 (product name and grade name), manufactured by Mitsubishi Gas Chemical Company, Inc.)

Layer (C-2): linear low-density polyethylene (Lupolex 18E FA (product name and grade name), density: 0.926 g/cm$^3$, MFR: 0.7 g/10 min., manufactured by LyondellBasell Industries)

Each layer of the multilayered tube of Example 2-5 had a thickness of 20 µm, 5 µm, and 15 µm in order for Layer (A), Layer (B), and Layer (C-2), and the multilayered tube had a flattened tube width of 160 mm. The multilayered tube of Example 2-5 had a low-temperature shrinkage ratio of 5.0% in the machine direction and 4.0% in the transverse direction.

Comparative Example 2-1

A multilayered tube was produced in the same manner as in Example 2-1 except that the following layer was used for Layer (C).

Layer (C): linear low-density polyethylene (Exeed 2018CA (product name and grade name), density: 0.918 g/cm$^3$, MFR: 2.0 g/10 min., manufactured by Exxon Mobil Chemical Company) obtained by polymerization using a metallocene catalyst.

Each layer of the multilayered tube of Comparative Example 2-1 had a thickness of 15 µm, 5 µm, and 15 µm in order for Layer (A), Layer (B), Layer (C), and the multilayered tube had a flattened tube width of 160 mm. The multilayered tube of Comparative Example 2-1 had a low-temperature shrinkage ratio of 5.0% in both the machine and transverse directions.

Comparative Example 2-2

A multilayered tube was produced in the same manner as in Example 2-1 except that the following layers were used for Layer (A) and Layer (C).

Layer (A): homopolymer of nylon 6 (Durethan B40FAM (product name and grade name), manufactured by LANXESS AG);

Layer (C): linear low-density polyethylene (density: 0.919 g/cm$^3$, MFR: 2.2 g/10 min., Stamylex 1026F (product name and grade name), manufactured by DEX Plastomers).

Each layer of the multilayered tube of Comparative Example 2-2 had a thickness of 15 μm, 5 μm, and 15 μm in order for Layer (A), Layer (B), and Layer (C), and the multilayered tube had a flattened tube width of 160 mm. The multilayered tube of Comparative Example 2-2 had a low-temperature shrinkage ratio of 4.0% in the machine direction and 2.5% in the transverse direction.

Comparative Example 2-3

A multilayered tube was produced in the same manner as in Example 2-1 except that an annealing treatment was conducted in such a manner that the tube surface temperature reached 40° C. (within the area about 10 cm away from the outlet of the annealing treatment).

Each layer of the multilayered tube of Comparative Example 2-3 had a thickness of 15 μm, 5 μm, and 15 μm in order for Layer (A), Layer (B), and Layer (C), and the multilayered tube had a flattened tube width of 160 mm. The multilayered tube of Comparative Example 2-3 had a low-temperature shrinkage ratio of 10.5% in the machine direction and 11.0% in the transverse direction.

Comparative Example 2-4

A multilayered tube was produced in the same manner as in Example 2-1 except that the following layer was used for Layer (C) and an annealing treatment was conducted in such a manner that the tube surface temperature reached 200° C. (within the area about 10 cm away from the outlet of the annealing treatment).

Layer (C): linear low-density polyethylene (Exeed 2018CA (product name and grade name), density: 0.918 g/cm$^3$, MFR: 2.0 g/10 min., manufactured by Exxon Mobil Chemical Company) obtained by polymerization using a metallocene catalyst.

Each layer of the multilayered tube of Comparative Example 2-4 had a thickness of 15 μm, 5 μm, and 15 μm in order for Layer (A), Layer (B), and Layer (C), and the multilayered tube had a flattened tube width of 160 mm. The multilayered tube of Comparative Example 2-4 had a low-temperature shrinkage ratio of 1.0% in the machine direction and 1.5% in the transverse direction.

Table 4 shows the components of each layer of the multilayered tubes of the Examples and Comparative Examples.

TABLE 4

|  | Layer (A) Components | Layer (B) Components | Layer (C) Components | Density (g/cm$^3$) |
|---|---|---|---|---|
| Example 2-1 | 6Ny-66Ny Copolymer | Maleic anhydride graft modified LLDPE | LLDPE (metallocene) Anti-blocking agent (Silica) | 0.923 |
| Example 2-2 | 6Ny-66Ny Copolymer | Maleic anhydride graft modified LLDPE | LLDPE Anti-blocking agent (Silica) | 0.945 |
| Example 2-3 | 6Ny | Maleic anhydride graft modified LLDPE | LLDPE (metallocene) Anti-blocking agent (Silica) | 0.923 |
| Example 2-4 | 6Ny | Maleic anhydride graft modified LLDPE | LLDPE Anti-blocking agent (Silica) | 0.921 |
| Example 2-5 | 70 wt % 6Ny-66Ny Copolymer 30 wt % of MX nylon | Maleic anhydride graft modified LLDPE | LLDPE Anti-blocking agent (Silica) | 0.926 |
| Comp. Ex. 2-1 | 6Ny-66Ny Copolymer | Maleic anhydride graft modified LLDPE | LLDPE (metallocene) Anti-blocking agent (Silica) | 0.918 |
| Comp. Ex. 2-2 | 6Ny | Maleic anhydride graft modified LLDPE | LLDPE Anti-blocking agent (Silica) | 0.919 |
| Comp. Ex. 2-3 | 6Ny-66Ny Copolymer | Maleic anhydride graft modified LLDPE | LLDPE (metallocene) Anti-blocking agent (Silica) | 0.923 |
| Comp. Ex. 2-4 | 6Ny-66Ny Copolymer | Maleic anhydride graft modified LLDPE | LLDPE Anti-blocking agent (Silica) | 0.918 |

The abbreviations in the tables are as defined below.
6Ny: 6-nylon
6Ny-66Ny copolymer: a copolymer of 6-nylon and 66-nylon
Maleic Anhydride Graft Modified LLDPE: maleic anhydride graft modified linear low-density polyethylene
LLDPE: linear low-density polyethylene
LLDPE (metallocene): linear low-density polyethylene obtained by using a metallocene catalyst The blocking resistance, adherence to meat, high-temperature shrinkage properties and low-temperature shrinkage properties of the multilayered tubes thus produced were evaluated by the methods described above. Table 5 shows the evaluation results.

TABLE 5

|  | Blocking resistance (g/15 mm in width) | Adherence to meat | Surface wetting tension of Layer (C) (mN/m) | High-temperature shrinkage properties (%) MD/TD | | Low-temperature shrinkage properties (%) MD/TD | |
| --- | --- | --- | --- | --- | --- | --- | --- |
| Example 2-1 | 5 | 1 | A | 40 | 15/15 1 | 5.0/5.0 | 1 |
| Example 2-2 | 3 | 1 | A | 40 | 10/12 1 | 4.0/3.0 | 1 |
| Example 2-3 | 5 | 1 | A | 38 | 13/14 1 | 4.0/2.5 | 1 |
| Example 2-4 | 40 | 1 | A | 38 | 11/12 1 | 3.0/2.0 | 1 |
| Example 2-5 | 10 | 1 | A | 40 | 9/11 1 | 5.0/4.0 | 1 |
| Comp. Ex. 2-1 | 65 | 2 | A | 40 | 15/15 1 | 5.0/5.0 | 1 |
| Comp. Ex. 2-2 | 80 | 2 | A | 40 | 13/14 1 | 4.0/2.5 | 1 |
| Comp. Ex. 2-3 | 100 | 2 | A | 40 | 24/26 1 | 10.5/11.0 | 2 |
| Comp. Ex. 2-4 | 3 | 1 | A | 40 | 2/2 2 | 1.0/1.5 | 1 |

EXPLANATION OF REFERENCE NUMERALS

1 Multilayered polyamide-based tube
3 Guide roll
4,4' Pinch rolls
5,5' Pinch rolls
6 Corona discharge electrode roller
6' Counter electrode roller
7 Corona discharge electrode roller
7' Counter electrode roller
8,8' Guide rolls
9,9' Guide rolls
10 Winder roll
11 Guide roll
12 Corona discharge electrode roller
12' Counter electrode roller
13 Corona discharge electrode roller
13' Counter electrode roller
A Corona treatment apparatus

The invention claimed is:

1. A multilayered polyamide-based tube for food packaging comprising a Layer (A), a Layer (B) and a Layer (C);
the multilayered polyamide-based tube having a low-temperature shrinkage ratio of 2 to 10%, and exhibiting heat shrinkage properties and gas barrier properties;
the Layer (A) containing a polyamide-based resin;
the Layer (B) containing a polyolefin-based resin; and
the Layer (C) that comes in contact with the packaged food, the Layer (C) being a Layer (C-1) that contains a polypropylene-based resin having a heat distortion temperature (ISO 75B-1 or ISO 75B-2) of not less than 60° C. and a Vicat softening point of not less than 120° C., and that has a surface wetting tension of not less than 35 mN/m; or
the Layer (C) being a Layer (C-2) that contains a linear low-density polyethylene having a density of not less than 0.92 g/cm³ but less than 0.95 g/cm³, and that has a surface wetting tension of not less than 35 mN/m.

2. The multilayered polyamide-based tube for food packaging according to claim 1, wherein the polyamide-based resin contained in the Layer (A) is at least one member selected from the group consisting of 6-nylon, 66-nylon, 11-nylon, 12-nylon, 610-nylon, 6T-nylon, crystalline aromatic nylon, amorphous aromatic nylon, copolymers of 6-nylon and 66-nylon, copolymers of 6-nylon and 12-nylon, copolymers of 6-nylon and 11-nylon, and copolymers of 6-nylon and 6T-nylon.

3. The multilayered polyamide-based tube for food packaging according to claim 1, wherein the polyolefin-based resin contained in the Layer (B) is at least one member selected from the group consisting of maleic anhydride modified polyolefins, ionomer resins, ethylene-vinylacetate copolymers, ethylene-ethyl acrylate copolymers, ethylene-acrylic acid copolymers, and ethylene-methacrylic acid copolymers.

4. The multilayered polyamide-based tube for food packaging according to claim 1, wherein the polypropylene-based resin of the Layer (C-1) has a heat distortion temperature (ISO 75B-1 or ISO 75B-2) of 60 to 120° C., and a Vicat softening point of 120 to 160° C.

5. The multilayered polyamide-based tube for food packaging according to claim 1, wherein the linear low-density polyethylene contained in the Layer (C-2) is a polymer obtained by polymerizing using a metallocene catalyst.

6. The multilayered polyamide-based tube for food packaging according to claim 1, which has a total film thickness of 30 to 80 μm.

7. A method for producing the multilayered polyamide-based tube for food packaging of claim 1, comprising the steps of:
(i) cylindrically co-extruding material compositions (A), (B) and (C) to give a tube having Layers (A), (B) and (C) respectively;
(ii) bi-axially drawing the tube obtained in Step (i);
(iii) applying an annealing treatment to the tube drawn in Step (ii); and
(iv) applying a corona treatment to the tube after the annealing treatment.

8. The multilayered polyamide-based tube for food packaging according to claim 2, wherein the polyolefin-based resin contained in the Layer (B) is at least one member selected from the group consisting of maleic anhydride modified polyolefins, ionomer resins, ethylene-vinylacetate copolymers, ethylene-ethyl acrylate copolymers, ethylene-acrylic acid copolymers, and ethylene-methacrylic acid copolymers.

9. The multilayered polyamide-based tube for food packaging according to claim 2, wherein the polypropylene-based resin of the Layer (C-1) has a heat distortion temperature (ISO 75B-1 or ISO 75B-2) of 60 to 120° C., and a Vicat softening point of 120 to 160° C.

10. The multilayered polyamide-based tube for food packaging according to claim 2, wherein the linear low-density polyethylene contained in the Layer (C-2) is a polymer obtained by polymerizing using a metallocene catalyst.

11. The multilayered polyamide-based tube for food packaging according to claim 2, wherein the linear low-density polyethylene contained in the Layer (C-2) is a polymer obtained by polymerizing using a metallocene catalyst.

* * * * *